United States Patent [19]

McClain et al.

[11] Patent Number: 4,893,865
[45] Date of Patent: Jan. 16, 1990

[54] UNITIZED COWL AND WIPER ARM ASSEMBLY

[75] Inventors: Michael J. McClain, Dayton; Harry C. Buchanan, Jr., Spring Valley; Glenn R. Reed, Dayton, all of Ohio

[73] Assignee: General Motors Corporation, Detroit, Mich.

[21] Appl. No.: 230,942

[22] Filed: Aug. 11, 1988

[51] Int. Cl.⁴ .............................................. B62D 25/08
[52] U.S. Cl. .................................... 296/192; 296/901; 15/250.01; 239/284.1
[58] Field of Search .................... 296/192, 194, 1, 901; 15/250.01, 250.31; 239/284.1

[56] References Cited

U.S. PATENT DOCUMENTS

| | | | |
|---|---|---|---|
| 2,643,909 | 6/1953 | Foster | 15/250.1 |
| 3,264,670 | 8/1966 | Barenyi et al. | 15/250.27 |
| 3,604,048 | 9/1971 | Mainka | 15/250.19 |
| 4,028,950 | 6/1977 | Osterday | 74/70 |
| 4,509,878 | 4/1985 | Bryson et al. | 403/71 |
| 4,679,845 | 7/1987 | Detampel | 296/192 |

Primary Examiner—Dennis H. Pedder
Attorney, Agent, or Firm—Patrick M. Griffin

[57] ABSTRACT

A unitized cowl and wiper arm assembly includes a blow molded plastic shell structure and two wiper arms of the integral type. At two locations, the shell is reformed so as to create an area of increased stiffness that includes a pair of spaced, overhanging interior flanges. This allows the journal portion of the arms to pass through the shell and be pivoted thereto between the spaced interior flanges. Thereafter, the arm is rigidly and securely supported. The leakproof interior of the shell may also be used for a fluid reservoir.

3 Claims, 5 Drawing Sheets

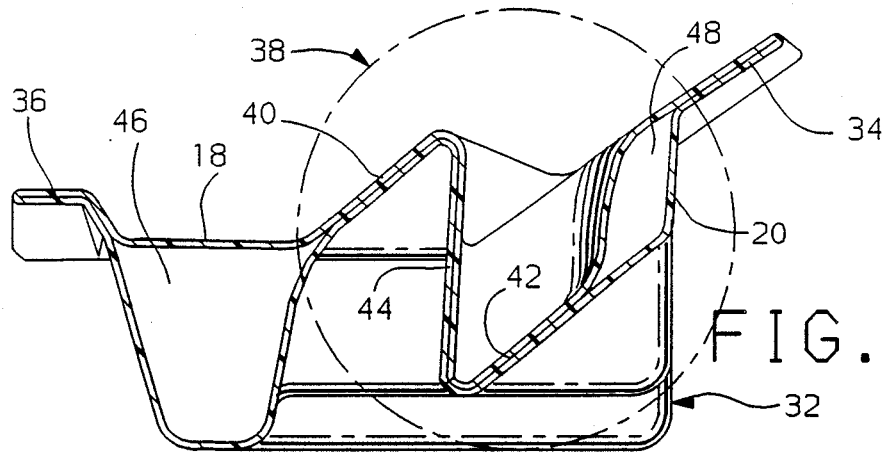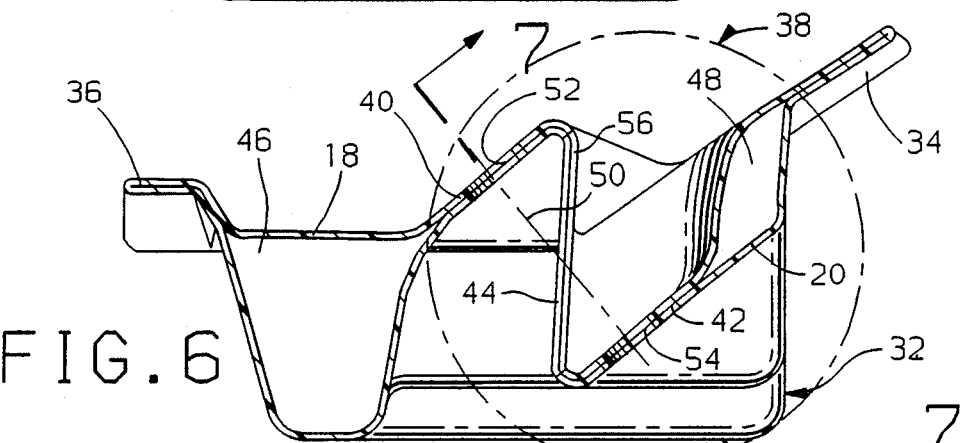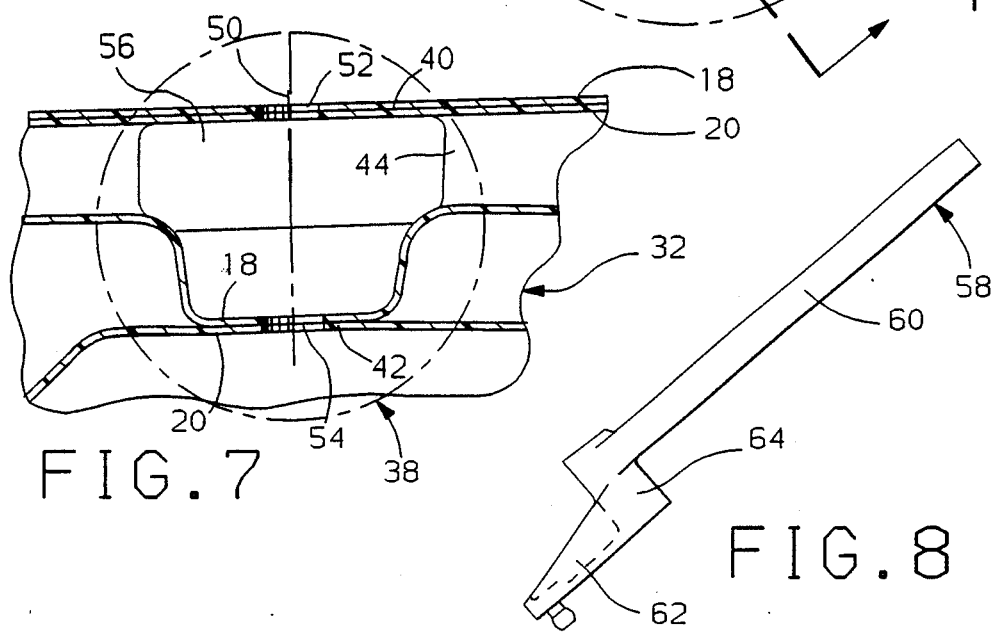

UNITIZED COWL AND WIPER ARM ASSEMBLY

BACKGROUND OF THE INVENTION

Automotive vehicle bodies usually have a gap between the back wall of the engine compartment and the lower edge of the windshield. This gap is bridged by a part that is referred to variously as a cowl, cowl panel, beauty panel or leaf screen. The cowl is secured along its lower edge to the body wall and along its upper edge to, or near, the lower edge of the windshield, and may be partially covered itself by the rear edge of the hood, especially in designs with hidden windshield wipers. Given its proximity to the windshield, the cowl provides a convenient foundation for the windshield wipers. Most often, the cowl is a single sheet structure to which is fixed a cylindrical housing that provides a sleeve bearing for the pivot shaft of a wiper arm. With such an arrangement, the pivot shaft must be passed through the bearing housing first, and the wiper arm completed afterward by attaching a crank arm to the lower end of the pivot shaft and a blade support to the upper end of the pivot shaft. Examples of such built up wiper arms and their pivot arrangements may be seen in USPN 4,509,878 to Bryson et al., and in USPN 4,028,950 to Osterday, both assigned to the assignee of the subject invention.

It is also known to use a wiper arm which, rather than being built up in stages, is integral or single piece. An integral arm has a crank arm on one end and a blade mount on the other offset from one another by an intermediate cylindrical journal that is generally perpendicular to both. A one piece arm cannot be passed through a sleeve or bearing housing. Instead, a stationary shaft that is fixed to a body support, and the journal arm is slipped over the free end of the shaft to pivot on the fixed shaft. An example may be seen in USPN 3,604,048 to Mainka. In all three of the above examples, the part that provides the bearing for the wiper arm, whether it be a cylindrical housing or a shaft fixed to the cowl, can act like a lever, tending to twist and bend the cowl when the arm is disturbed. Forces tending to disturb the arm may come from several sources, but the force of the drive linkage acting on the crank arm is generally the greatest. It may be difficult for a single sheet of material to resist these bending moments, especially when the pivot bearing has a significant length. This necessitates either that the cowl be made of heavy gage material, or that it be reinforced, as in Mainka.

USPN 3,264,670 to Barenyi et al shows, in one embodiment, a foundation for a wiper arm that consists of more than a single sheet. Specifically, as seen in FIG. 5, upper and lower metal panels are seamed together along their outer edges to create a box that is hinged along its lower edge only to the vehicle body, without being secured to the windshield at all. The wiper arm is the built up type, with a cylindrical bearing housing and a pivot shaft journal through it. The bearing housing is joined to the two spaced panels of the box in basically the same way that it would be joined to a single panel. That is, the bearing housing is passed through the panels, although two aligned holes are needed in this instance, as there are two panels. It would be just as difficult, more so in fact, to pass an integral type wiper arm through a pair of aligned holes, as opposed to passing it through a single hole in a single panel. It could be done if the holes were greatly oversized, but that would remove most of the panel material around the potential pivot point. Barenyi et al. is not directed to improving the mounting of the wiper arm to the cowl per se, but to mounting several other components, including the motor and drive linkage, to the cowl.

SUMMARY OF THE INVENTION

The invention provides a utilized cowl and wiper arm assembly that provides the structural stiffness of a shell, having two layers or panels flanged together along their peripheral edges. However, the shell is specially configured to create areas of increased stiffness that not only allow a wiper arm of the integral type to be easily passed through the shell, but also allow it to be pivoted to the shell with increased rigidity. In addition, in the embodiment disclosed, the shell is made as a plastic blow molded structure that provides a leak-proof washer fluid reservoir with no additional structure.

The main body of the assembly is a shell with upper and lower panels seamed together along their peripheral edges. At specific locations, the panels are crimped together in opposite directions, thereby creating an area of increased stiffness bordered by upper and lower shell portions. Specifically, the upper panel is deformed locally down against the lower panel at a location substantially midway between the peripheral flanges, at an acute angle to the desired axis of rotation of the wiper arm. Concurrently, at a closely adjacent location, the lower panel is crimped up against the upper panel and in the opposite and parallel direction. This selective reforming of the shell creates a double thickness wall with a generally Z shaped cross section, including upper and lower overlapping interior flanges spaced apart by a diagonally extending wall. The upper and lower flanges, in turn, are bordered by structurally complete upper and lower shell portions. In the embodiment disclosed, the upper and lower panels are plastic skins, so the interior of the shell is leakproof.

Once the shell has been reformed as described, a sufficient portion of the diagonally extending wall is cut away to allow the arm to pass therethrough, but the fluid tightness of the interior is not jeopardized. The cylindrical journal of the arm is pivoted between the overlapping flanges. This locates the blade support of the arm above the lower shell portion, where it will extend over the windshield, and locates the drive member below the upper shell portion, where it is protected. The shell and arm, together with any other components secured to the shell, form a unit that may be secured in one step to the vehicle. In operation, the arm will be very rigidly confined between the overlapping interior flanges. Disturbing forces acting on the arm will be initially resisted by the high stiffness of the double thickness flanges and the diagonal wall. Since the area of increased stiffness is integral with the rest of the shell and located generally centrally in the shell substantially the entire shell will also see and resist any deformation in that area. The blow molded seams are strong enough to resist parting, so windshield washer fluid may be stored in the hollow interior of the shell. A washer pump and nozzle may also be secured to the shell, and the ducting needed to connect the pump to the nozzle may be molded integrally into the shell, eliminating more standard components and fittings.

It is, therefore, an object of the invention to provide a unitized cowl and wiper arm assembly that provides the structural stiffness of a shell, but which allows an integral type wiper arm to be easily passed through and pivoted thereto.

It is another object of the invention to locally reform the shell to create an area through which the integral wiper arm may be easily passed and which has an increased stiffness so that the arm can be securely pivoted at that location to the shell.

It is yet another object of the invention to locally reform the shell by crimping the lower panel up against the upper panel and concurrently crimping the upper panel down against the lower panel at an adjacent location and in a direction tilted relative to the desired axis of the wiper arm pivot, thereby creating upper and lower overlapping interior flanges between which the journal of the wiper arm may be pivoted.

It is still another object of the invention to provide a shell and wiper arm unit in which the shell is a blow molded plastic structure to which the arm may be securely pivoted without disturbing the fluid tight interior of the shell, so that the assembly may also provide fluid storage and handling capacity.

DESCRIPTION OF THE PREFERRED EMBODIMENT

These and other objects and features of the invention will appear from the following written description, and from the drawings, in which:

FIG. 5 shows a cross section of the shell through one of the areas of increased stiffness;

FIG. 6 shows various parts of the area of increased stiffness cutout to allow the arm to be pivoted thereto;

FIG. 7 is a sectional view taken along the line 7—7 of FIG. 6;

FIG. 8 is a view of the integral arm before attachment to the shell;

Figure 1:
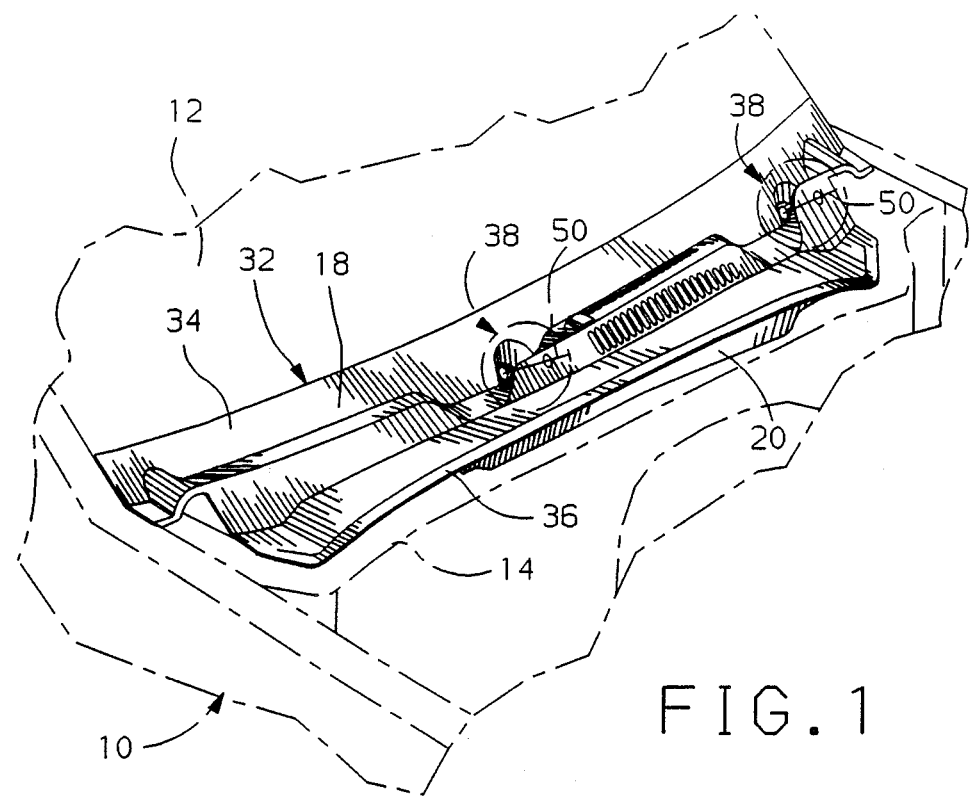
FIG. 1 is a perspective view of the shell before the wiper arms are added, showing the position of a windshield and bulkhead wall of a vehicle body in dotted lines.
Figure 9:
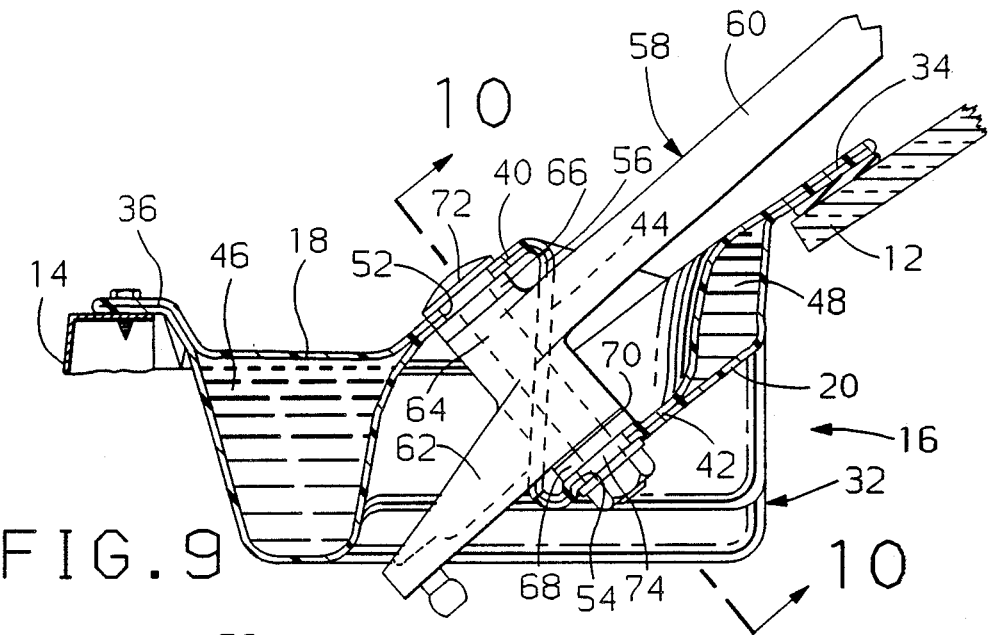
FIG. 9 is a view of the arm after attachment and after installation of the shell.

Referring first to FIGS. 1 and 9, a portion of a vehicle body 10 and windshield 12 are illustrated. Vehicle body 10 typically includes a bulkhead or engine compartment wall 14 that runs generally parallel to the lower edge of the windshield 12, creating a gap that must be covered. The assembly of the invention, a preferred embodiment of which is indicated generally at 16, is a unit sized and configured so as to cover the gap, and is installed by securing it to the windshield 12 and the wall 14. The basic structure of assembly 16 may be clearly understood by reference to its process of manufacture, described next.

Figure 2:
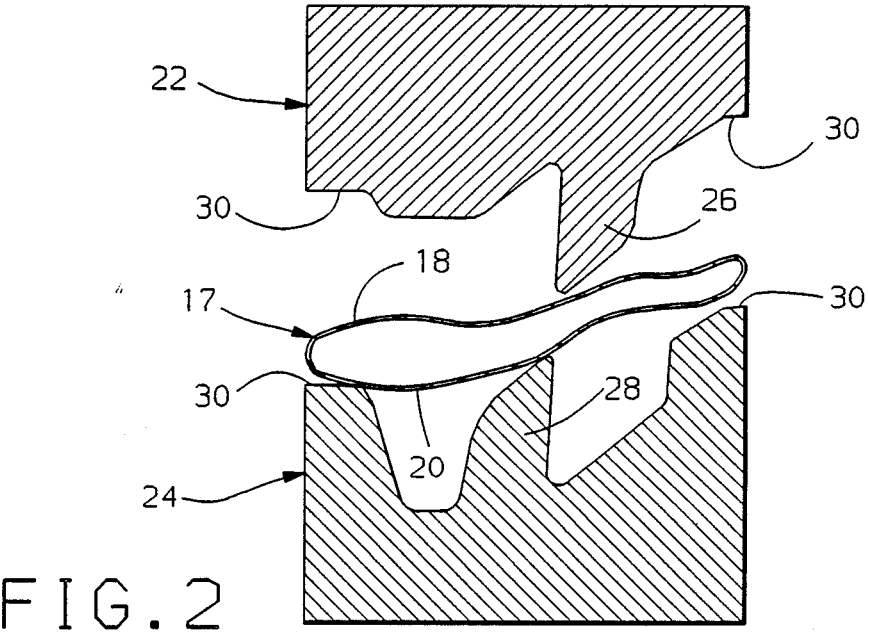
FIGS. 2 through 4 show steps in the process of forming the shell.

Referring next to FIG. 2, the main structure or foundation of assembly 16 is manufactured from a blank known as a "parison", indicated generally at 17. Parison 17 is a workpiece of standard length and size formed from an extruded plastic tube of high density polyethylene, polypropylene or other suitable material. When parison 17 is partially collapsed to the general shape shown, it may be thought of as being a rough shell with upper and lower panels 18 and 20 respectively. The panels 18 and 20 are generally parallel and symmetrical, so parison 17 may be conceptualized as having a generally central plane which the panels 18 and 20 are disposed to either side of. Parison 17 is placed in between a pair of upper and lower dies or molds, indicated at 22 and 24 generally. Upper mold 22 has an inner surface that includes a jaw or projection 26 located about midway between its outer edges, while the surface of lower mold 24 has a closely adjacent projection 28 of similar shape and generally parallel orientation. In the embodiment disclosed, there would be two sets of die projections like 26 and 28. While the projections 26 and 28 of each set are basically parallel to one another, they are not exactly perpendicular to the general plane of the parison described above. Stated differently, since the desired axis of rotation of the wiper arm, described below, will be generally normal to that plane, the projections 26 and 28 may be considered to have an acute angle or tilt relative to that axis.

Figure 3:
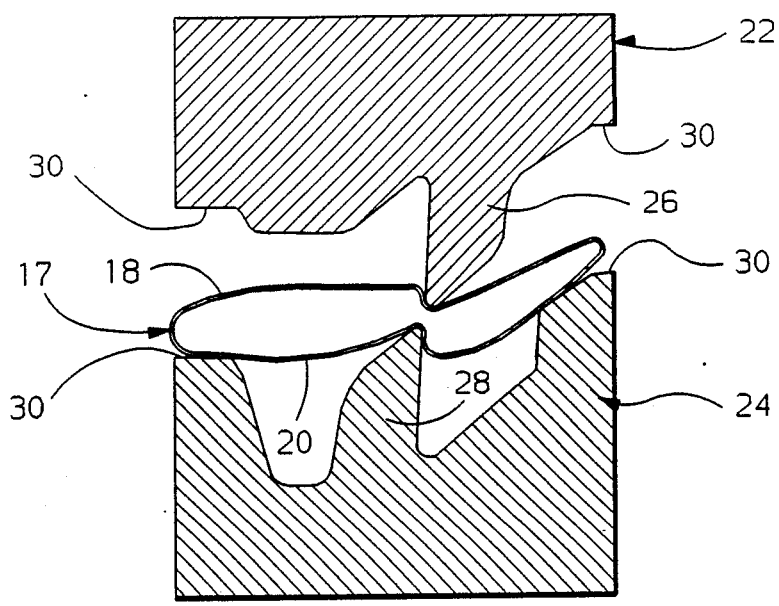
Figure 4:
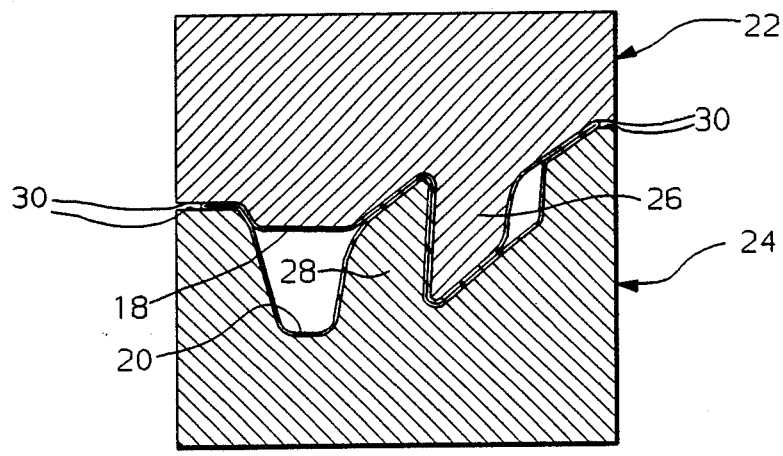

Referring next to FIGS. 2 through 4, as the dies 22 and 24 are closed together, the projections 26 and 28 of each set will shear closely past one another in opposite but parallel directions, like the blades of a pair of scissors, or like a pair of upper and lower front teeth. After the dies 22 and 24 are closed, the facing surfaces of the projections 26 and 28 will be spaced from one another by approximately the combined wall thicknesses of the panels 18 and 20. Comparing FIGS. 4 and 5, it may be seen that the general effect on parison 17 is to push or crimp the lower panel 20 upwardly toward the upper panel 18 at a location approximately midway between the edges of the dies 22 and 24, while concurrently, the upper panel 18 is pushed or crimped downwardly toward the lower panel 20 at a closely adjacent location. Simultaneously, the outer edges of the panels 18 and 20 are seamed together by the edges 30 of the dies 22 and 24. After the dies 22 and 24 are closed, air is blown between the panels 18 and 20 to conform them to the entire inner surfaces of the dies 22 and 24.

Figure 12:
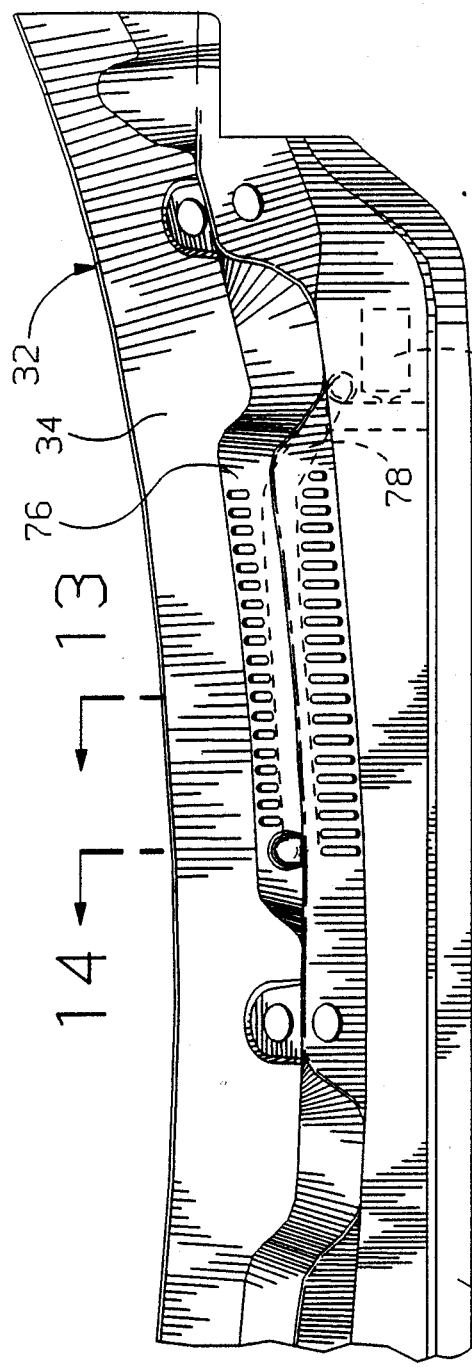
FIG. 12 is a plan view of the shell.

Referring next to FIGS. 5 and 12, the result of the above process is a finished plastic shell, designated generally at 32. Shell 32, when cool, is structurally complete and stiff, with first and second peripheral flanges 34 and 36 that may be fastened or glued to the desired part of the vehicle. Although the upper and lower surfaces or skins of finished shell 32 have many undulations and features molded into them, they are still basically the upper and lower parison panels 18 and 20, and shell 32 may also be considered to have a generally horizontal central plane. Most significant to the invention here are the areas where shell 32 has been reformed by the projections 26 and 28, which are circled and indicated generally at 38. These areas, of which there are two, are locally more stiff than the rest of shell 32, as will be described in more detail below. Areas 38, although integral with the whole shell 32, may be thought of as separate substructures, and described in several possible ways. Looking at just the surfaces of shell 32, a logical way of describing each area 38 would be as adjacent concavities in the upper and lower surfaces. The concavities are important in that they provide sufficient clearance to allow a wiper arm, described below, to be oscillated. However, it is more useful to describe the tangible part of area 38, rather than the voids, which is best done in the sectional views.

Referring next to FIGS. 5, 6, and 7, area 38, when it is sectioned through, may be described as a a double thickness wall with a Z shaped cross section. More specifically, the Z shape is comprised of spaced upper and lower interior flanges 40 and 42 which lie generally parallel to the plane of shell 32, and which are joined by a diagonally extending central wall 44. Because of the relative orientation and location of the die projections 26 and 28 described above, the interior flanges 40 and 42 overlap or overhang one another, and are kept rigidly spaced by the wall 44, which is inclined relative to the central plane of shell 32. The overlapping relation of the flanges 40 and 42 serves an important purpose described below. While the part of shell 32 bordering each of the interior flanges 40 and 42 is integral with the entire shell 32, it, too, may be described as a separate substructure, specifically as upper and lower shell portions 46 and 48 respectively, with the relative location defined with respect to a wiper arm 58. The upper and lower shell portions 46 and 48 are likewise spaced from one another, and are each structurally complete and stiff, that is, they are bounded by the peripheral flanges 34 and 36 and by the interior flanges 40 and 42 respectively. As best seen in FIGS. 6 and 7, the desired wiper arm pivot axis 50, which is generally normal to the plane of shell 32, is defined by cutting aligned circular holes 52 and 54 through the interior flanges 40 and 42. Central wall 44, which has an acute angle relative to axis 50, is cutout at 56 to provide arm clearance. An important property of shell 32 is that, since the panels 18 and 20 are plastic and uninterrupted, and since all of the various flanges 34, 36 and 40, 42 have fluid tight seams, it's entire inner volume is fluid tight, which serves a purpose described below.

Referring next to FIGS. 8 and 9, the other basic part of the assembly 16 is a wiper arm, designated generally at 58. Arm 58 is the integral, one piece type, with a blade mount 60 and a generally parallel drive member 62 offset from one another across a generally perpendicular bearing journal 64. While an integral arm like 58 could not be passed through a pair of aligned round holes the size of 52 and 54, it can be passed through shell 32 and pivoted thereto at the area 38. In particular, the orientation and separation of the upper and lower interior flanges 40 and 42, and the size of the cutout 56 through wall 44, allow the arm blade mount 60 to be inserted through cutout 56 until the journal 64 is located between the interior flanges 40 and 42, aligned with axis 50. Arm journal 64 is sandwiched between a flat, upper thrust washer 66 that sits against the undersurface of upper flange 40 and a lower, stepped thrust washer 68 that fits through lower flange hole 54. A layer of low friction, partially compressible material 70 may be placed between lower washer 68 and the lower end of journal 64 to take up tolerance variations. Then, a bolt 72 is pushed through journal 64 and a nut and washer assembly 74 is threaded to the lower end of bolt 72. Arm 58 is thus securely and squarely pivoted to the shell 32 with the blade mount 60 above the lower shell portion 48 and the drive member 62 located below the upper shell portion 46. Two arms 58 are pivoted to shell 32 in this fashion, one at each area 38. Then, the entire assembly 16 is installed to the vehicle body 10 by cementing the first peripheral flange 34 to the windshield 12 and fastening the second peripheral flange 36 to the bulkhead 14. So, the particular configuration of area 38 provides two important advantages in the manufacture and installation of assembly 16, allowing the arm 60 to pass easily through the shell 32, and also providing a convenient pivot point between the overlapping interior flanges 40 and 42. Since the various holes 52, 54 and 56 do not disrupt the fluid tight interior of shell 32, it can, with the addition of a suitable cap, be filled with windshield washer fluid, as shown. Washer fluid bottles are relatively large volume, and occupy a significant portion of the under hood space, so it is a great advantage to replace it with the otherwise empty volume of the shell 32. Given its large area, shell 32 need not be especially thick to supply a large volume.

Figure 10:
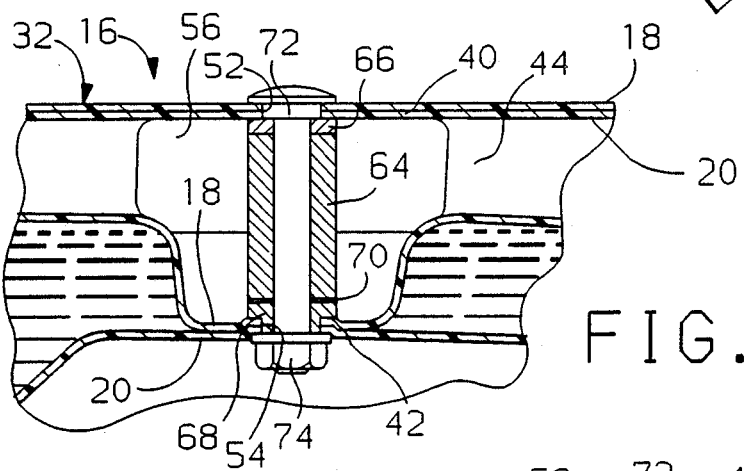
FIG. 10 is a sectional view taken along the line 10—10 of FIG. 9.
Figure 11:
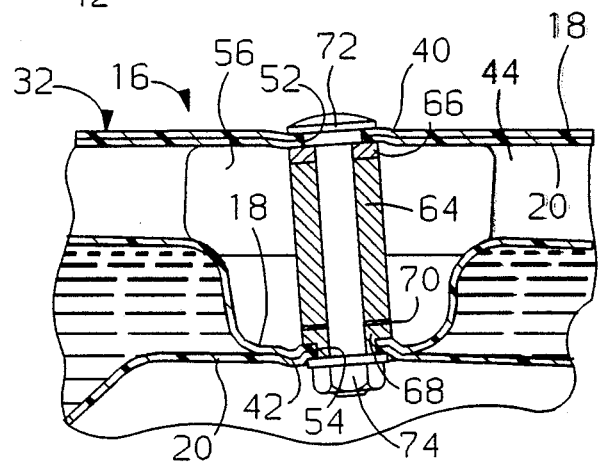
FIG. 11 is a view like FIG. 10 but showing the action to disturbing forces on the arm.

Referring next to FIGS. 10 and 11, it may be seen how the area 38, besides allowing arm 58 to be easily pivoted to the shell 32, also improves the operation of arm 58. Arm 58 is subject to fairly severe disturbing forces, especially from the drive linkage, not shown, acting on the drive member 62, which tends to tip the journal 64. In a conventionally mounted arm, the arm drive member 62 would be located below the cowl, some times well below, creating a relatively large lever arm that would act strongly to deform the cowl, be it a single or double panel structure. Here, by virtue of the way the arm 58 is passed through and pivoted to the shell 32 at the area 38, the drive member 62 and journal 64 are effectively located inside the shell 32. That is, journal 64 is located axially between the interior flanges 40 and 42, and laterally between the upper and lower shell portions 46 and 48. This location significantly reduces the lever arm with which the journal 64 can act on any part of the shell 32. Furthermore, the entire configuration of the area 38 cooperates to strongly resist any deformation that does occur. The area 38, by virtue of being crimped down and up, is significantly stiffened relative to the rest of the shell 32, like a corrugation in a single panel. Furthermore, the interior flanges 40 and 42 to which the journal 64 is directly pivoted, and wall 44, are stiff by virtue of being double thickness. The wall 44, even after being cutout, strongly resists movement of the flanges 40 and 42 away from or toward one another. In addition, by virtue of the fact that area 38 is integral with and located generally centrally within the shell 32, any forces that the flanges 40 and 42 see are distributed effectively and efficiently throughout the rest of the shell 32. Specifically, any deformation of the area 38 is resisted by the bordering upper and lower shell portions 46 and 48, and, from there, the forces are distributed throughout the upper and lower panels 18 and 20. The degree of deformation shown in FIG. 11 would, in fact, not likely occur because of the high strength and rigidity of shell 32 and the area 38. The seams in the area 38 are strong enough to remain intact, so the fluid tightness of the interior is not affected.

Figure 14:
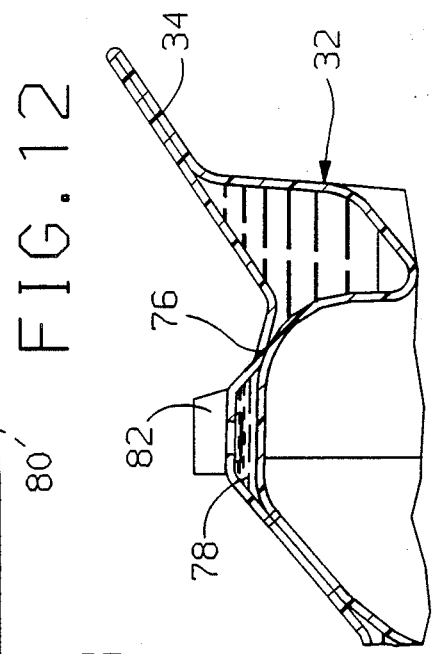
FIG. 14 is a cross sectional view taken along the line 14—14 of FIG. 12.
Figure 13:
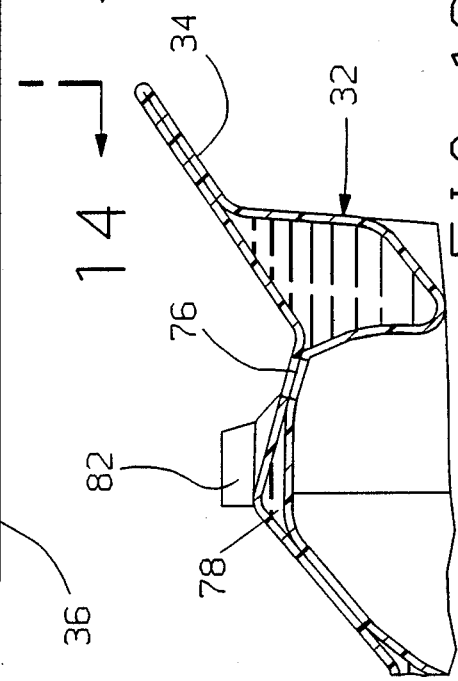
FIG. 13 is a cross sectional view taken along the line 13—13 of FIG. 12.

Referring next to FIGS. 12, 13 and 14, an additional advantage of assembly 16 that is achieved with little or no additional structure may be seen. When shell 32 is molded, its central area running between the two areas 38 is crimped down to create a flat shelf 76 that is slotted or louvered to admit air for the vehicle's air conditioning and ventilation system. Blow molded integrally into shelf 76 is a washer fluid passage 78. The lower end of passage 78 may be connected to the outlet of a pump, the general location of which is shown at 80. Pump 80 may also be secured to the shell 32, and draws fluid from the interior. The upper end of passage 78 has a nozzle 82 mounted through it to spray the windshield 12. Incorporating the passage 78 into the shell 32 gives even more unitization and reduction of parts, eliminating the conventional washer hose.

Variations of the preferred embodiment may be made within the spirit of the invention. The shell 32 need not incorporate the fluid reservoir in its interior and the integrally molded passage 78, but could be used as a structural foundation only for mounting the wiper arms 58. On the other hand, if it were desired to use the shell 32 as a reservoir, but to mount a more conventional type of wiper arm to the shell 32, that could be done as well, so long as the arm was pivoted to and through the shell 32 in such a way as to keep the interior fluid tight. The area of increased stiffness 38 provides a particularly advantageous way of mounting the wiper arm 58 to shell 32, however, since the flanges 40 and 42 and wall 44 do not disturb the fluid tight nature of the interior of shell 32. Area 38 need not be exactly midway between the peripheral flanges 34 and 36, but its generally central location allows it to efficiently transmit the arm forces that it sees throughout the shell 32. Therefore, it will be understood that the invention is not intended to be limited to just the embodiment disclosed.

The embodiments of the invention in which an exclusive property or privilege is claimed are defined as follows:

1. A unitized cowl and wiper arm assembly for a vehicle having a windshield and vehicle body a portion of which is spaced from a windshield, said assembly comprising,
   a wiper arm having a drive member at one end and a blade support at the other end offset from one another, and,
   a shell having upper and lower panels seamed together at their outer edges to form a structurally complete member with first and second peripheral flanges adapted to be secured to said vehicle body portion and windshield respectively, said lower panel being crimped up against said upper panel at a first location substantially midway between said peripheral flanges and said upper panel being crimped down in the opposite direction against said lower panel at a second location adjacent said first location so as to create a localized area of increased stiffness integral with said shell bounded by a lower shell portion offset at a central wall from an upper shell portion sufficiently to allow said wiper arm to pass through an aperture in said central wall and between said upper and lower shell portions,
   whereby, said wiper arm may be passed through said aperture at said area of increased stiffness and pivoted to said shell at said area with said blade support located above said lower shell portion and with said drive member located below said upper shell portion, thereby forming an assembly that can be installed to said vehicle as a unit, after which any disturbing forces acting on said wiper arm will be resisted by said area of increased stiffness and substantially the entire shell.

2. A unitized cowl and wiper arm assembly for a vehicle having a windshield and a vehicle body a portion of which is spaced from a windshield, said assembly comprising,
   a unitary wiper arm having a drive member at one end and a blade support at the other end offset from one another at a generally cylindrical journal portion disposable about a desired axis of wiper arm rotation, and,
   a shell having upper and lower panels seamed together at their outer edges to form a structurally complete member with first and second peripheral flanges adapted to be secured to said vehicle body portion and windshield respectively, said lower panel being crimped up against said upper panel at a first location substantially midway between said peripheral flanges and at an angle relative to said axis of rotation and said upper panel being crimped down in the opposite and parallel direction against said lower panel at a second location adjacent said first location so as to create a localized area of increased stiffness substantially midway between said peripheral flanges with lower and upper interior flanges that overlap relative to said axis of rotation and which are spaced from one another sufficiently across an apertured central wall to locate said wiper arm journal portion in said aperture between said upper and lower flanges,
   whereby, said wiper arm may be passed through said apertured central wall at said area of increased stiffness and said wiper arm journal portion pivoted between said overlapping upper and lower flanges with said blade support located above said lower flange and with said drive member located below said upper flange, thereby forming an assembly that can be installed to said vehicle as a unit, after which any disturbing forces acting on said wiper arm will be resisted by said area of increased stiffness and by substantially the entire shell.

3. A unitized cowl and wiper arm, and fluid containing assembly for a vehicle having a windshield and a vehicle body a portion of which is spaced from a windshield, said assembly comprising,
   a wiper arm having a drive member at one end and a blade support at the other end offset from one another at a bearing portion, and,
   a blow molded plastic shell having upper and lower skins seamed together at their outer edges to form a structurally complete member with fluid tight first and second peripheral flanges, so that fluid may be contained between said skins, said flanges further being adapted to be secured to said vehicle body portion and windshield respectively,
   said shell further including upper and lower fluid tight interior flanges located approximately midway between said first and second peripheral flanges and spaced apart across an aperture sufficiently large to pass said wiper arm bearing portion therethrough, and,
   means pivoting said wiper arm bearing portion through said aperture to said upper and lower interior flanges
   whereby, said wiper arm and shell form an assembly that can be installed to said vehicle as a unit within which fluids may be held, with any disturbing forces acting on said wiper arm being resisted by substantially the entire upper and lower skins of said shell.

* * * * *